US008849987B2

(12) United States Patent
Berg et al.

(10) Patent No.: US 8,849,987 B2
(45) Date of Patent: Sep. 30, 2014

(54) AUTOMATED DISCOVERY OF A TOPOLOGY OF A DISTRIBUTED COMPUTING ENVIRONMENT

(75) Inventors: Daniel Christopher Berg, RTP, NC (US); Brad Lee Blancett, Raleigh, NC (US); Michael Damein Elder, Durham, NC (US); Chad Holliday, Holly Springs, NC (US); Michael Husayn Kalantar, Chapel Hill, NC (US); Alexander V. Konstantinou, Hawthorne, NY (US); Narinder Makin, Morrisville, NC (US); Timothy Allen Pouyer, Greenville, SC (US); John E. Swanke, Southbury, CT (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 12/494,374

(22) Filed: Jun. 30, 2009

(65) Prior Publication Data

US 2010/0030893 A1 Feb. 4, 2010

Related U.S. Application Data

(63) Continuation-in-part of application No. 12/181,737, filed on Jul. 29, 2008, now Pat. No. 8,291,378.

(51) Int. Cl.
*G06F 15/173* (2006.01)
*G06F 9/44* (2006.01)
*G06F 9/50* (2006.01)

(52) U.S. Cl.
CPC .................................. *G06F 9/5061* (2013.01)
USPC .......................................... 709/224; 717/105

(58) Field of Classification Search
CPC ................................................ G06F 8/61–8/68
USPC ........... 717/104–105, 174–178; 709/220–222
See application file for complete search history.

(56) References Cited

U.S. PATENT DOCUMENTS

| | | | |
|---|---|---|---|
| 5,950,011 | A | 9/1999 | Albrecht et al. |
| 5,970,490 | A | 10/1999 | Morgenstern |
| 6,256,773 | B1 | 7/2001 | Bowman-Amuah |
| 6,629,065 | B1 | 9/2003 | Gadh et al. |
| 6,701,514 | B1 | 3/2004 | Haswell et al. |
| 6,789,054 | B1 | 9/2004 | Makhlouf |
| 6,795,089 | B2 | 9/2004 | Rajarajan et al. |
| 7,050,872 | B2 | 5/2006 | Matheson |
| 7,069,541 | B2 | 6/2006 | Dougherty et al. |
| 7,069,553 | B2 | 6/2006 | Narayanaswamy et al. |
| 7,103,874 | B2 | 9/2006 | McCollum et al. |
| 7,134,122 | B1 | 11/2006 | Sero et al. |
| 7,196,712 | B2 | 3/2007 | Rajarajan et al. |

(Continued)

OTHER PUBLICATIONS

Arnold, W., et al., "Pattern Based SOA Deployment," Proc. of 5th Int'l. Conf. on Service-Oriented Computing (ICSOC 2007), Sep. 17-20, 2007, Lecture Notes in Computer Science (LNCS), vol. 4749, Springer 2007.

(Continued)

*Primary Examiner* — Chirag R Patel
(74) *Attorney, Agent, or Firm* — Stevens & Showalter, LLP

(57) ABSTRACT

This invention provides an extensible means of defining the mechanism to find one or more type(s) or instance(s) of existing resources (files, databases, repositories, etc.) and automating their linkages to the artifacts to be created, based on the customizable matching rules.

24 Claims, 6 Drawing Sheets

(56) References Cited

U.S. PATENT DOCUMENTS

| | | | |
|---|---|---|---|
| 7,320,120 | B2 | 1/2008 | Rajarajan et al. |
| 7,370,315 | B1 | 5/2008 | Lovell et al. |
| 7,463,263 | B2 | 12/2008 | Gilboa |
| 7,568,019 | B1 | 7/2009 | Bhargava et al. |
| 7,630,877 | B2 | 12/2009 | Brown et al. |
| 7,643,597 | B2 | 1/2010 | Liu et al. |
| 7,665,085 | B2* | 2/2010 | Sundararajan et al. ........ 717/174 |
| 7,669,137 | B2 | 2/2010 | Chafe et al. |
| 7,735,062 | B2 | 6/2010 | de Seabra e Melo et al. |
| 7,900,201 | B1 | 3/2011 | Qureshi et al. |
| 7,962,891 | B2 | 6/2011 | Kimelman et al. |
| 2003/0037327 | A1* | 2/2003 | Cicciarelli et al. ............ 717/178 |
| 2003/0084156 | A1 | 5/2003 | Graupner et al. |
| 2003/0163450 | A1 | 8/2003 | Borenstein et al. |
| 2004/0177352 | A1 | 9/2004 | Narayanaswamy et al. |
| 2004/0179011 | A1 | 9/2004 | Marshall |
| 2004/0261053 | A1 | 12/2004 | Dougherty et al. |
| 2005/0055692 | A1* | 3/2005 | Lupini et al. ................... 717/174 |
| 2005/0198244 | A1 | 9/2005 | Eilam et al. |
| 2005/0204354 | A1 | 9/2005 | Sundararajan et al. |
| 2006/0053410 | A1 | 3/2006 | Charisius et al. |
| 2006/0066627 | A1 | 3/2006 | Gerhard et al. |
| 2006/0101091 | A1 | 5/2006 | Carbajales et al. |
| 2006/0101445 | A1 | 5/2006 | Carbajales et al. |
| 2006/0168558 | A1 | 7/2006 | de Seabra e Melo et al. |
| 2006/0235733 | A1 | 10/2006 | Marks |
| 2006/0271909 | A1 | 11/2006 | Huang et al. |
| 2007/0074203 | A1* | 3/2007 | Curtis et al. .................. 717/174 |
| 2007/0168925 | A1 | 7/2007 | Bornhoevd et al. |
| 2007/0179823 | A1 | 8/2007 | Bhaskaran et al. |
| 2007/0277151 | A1 | 11/2007 | Brunel et al. |
| 2007/0288885 | A1 | 12/2007 | Brunel et al. |
| 2008/0028365 | A1 | 1/2008 | Erl |
| 2008/0082959 | A1 | 4/2008 | Fowler |
| 2008/0127049 | A1 | 5/2008 | Elaasar |
| 2008/0183725 | A1 | 7/2008 | Blakeley et al. |
| 2008/0313008 | A1 | 12/2008 | Lee et al. |
| 2008/0313595 | A1 | 12/2008 | Boulineau et al. |
| 2008/0313596 | A1 | 12/2008 | Kreamer et al. |
| 2009/0006069 | A1 | 1/2009 | Alam et al. |
| 2009/0007062 | A1 | 1/2009 | Gilboa |
| 2009/0012842 | A1 | 1/2009 | Srinivasan et al. |
| 2009/0044170 | A1* | 2/2009 | Bernardi et al. ............... 717/105 |
| 2009/0077621 | A1 | 3/2009 | Lang et al. |
| 2009/0132562 | A1 | 5/2009 | Mehr et al. |
| 2009/0171993 | A1 | 7/2009 | Arthursson |
| 2009/0249281 | A1 | 10/2009 | Fritzsche et al. |
| 2009/0278847 | A1 | 11/2009 | Berg et al. |
| 2009/0319239 | A1 | 12/2009 | Arnold et al. |
| 2009/0319467 | A1 | 12/2009 | Berg et al. |
| 2010/0030893 | A1 | 2/2010 | Berg et al. |
| 2010/0031247 | A1 | 2/2010 | Berg et al. |
| 2010/0058331 | A1 | 3/2010 | Berg et al. |
| 2010/0070449 | A1 | 3/2010 | Arnold et al. |
| 2010/0077328 | A1 | 3/2010 | Berg et al. |
| 2010/0083212 | A1 | 4/2010 | Fritzsche et al. |
| 2010/0138795 | A1 | 6/2010 | Berg et al. |
| 2011/0016074 | A1 | 1/2011 | Berg et al. |
| 2011/0029967 | A1 | 2/2011 | Berg et al. |

OTHER PUBLICATIONS

Eilam, T., et al., "Reducing the Complexity of Application Deployment in Large Data Centers," Proc. of 9th IFIP/IEEE Int'l. Sym. on Integrated Network Management (IM 2005), pp. 221-234, May 15-19, 2005.

Corneil, D., et al., "An Efficient Algorithm for Graph Isomorphism," Journal of the ACM, vol. 17, pp. 51-64, Jan. 1970.

Ullman, J., "An Algorithm for Subgraph Isomorphism," Journal of the ACM, vol. 23, pp. 31-42, Jan. 1976.

Gati, G., "Further Annotated Bibliography on the Isomorphism Disease," Journal of Graph Theory, 1979; pp. 96-109; vol. 3, pp. 96-109, 1979.

Messmer, B.T., "Efficient Graph Matching Algorithms," University of Bern, PhD thesis, Switzerland, Nov. 1995.

Tsai, W., et al., "Error-correcting Isomorphisms of Attributed Relational Graphs for Pattern Analysis," IEEE Transactions on Systems, Man, and Cybernetics, vol. SMC-9, No. 12, pp. 757-768, Dec. 1979.

Tecklu, Isaac; Office Action—Non-Final Rejection in U.S. Appl. No. 13/435,506; Jun. 26, 2013; U.S. Patent and Trademark Office; Alexandria, VA.

Tecklu, Isaac; Non-Final Office Action in U.S. Appl. No. 12/181,737; Feb. 24, 2012; U.S. Patent and Trademark Office; Alexandria, VA.

Bharadwaj, Kalpana; Non-Final Office Action in U.S. Appl. No. 12/210,139; Dec. 27, 2011; U.S. Patent and Trademark Office; Alexandria, VA.

Hanchak, Walter; Non-Final Office Action in U.S. Appl. No. 12/504,511; Jan. 4, 2012; U.S. Patent and Trademark Office; Alexandria, VA.

Peiris, Mulder, Cicoria, Bahree and Paathek; Pro WCF Practical Microsoft SOA Implementation; APRESS, Berkeley, CA; 2007.

Kodali, Raghu; What is service-oriented arthitecture?; Java World; "http://www.javaworld.com/javaworld/jw-06-2005/jw-0613-soa.html"; Jun. 2006; pp. 1-5.

Parikh and Gurajada; "SOA for the Real World"; Java World; "http://www.javaworld.com/javaworld/jw-11-2006/jw-1129-soa.html"; Nov. 2006; pp. 1-3.

Erl, Thomas; "Introducing SOA Design Patterns", SOA World Magazine; vol. 8, Issue 6; Jun. 2008; pp. 2-7.

Bhargava, Anil; Non-Final Office Action in U.S. Appl. No. 12/325,664; Mar. 25, 2011; U.S. Patent and Trademark Office; Alexandria, VA.

Bhargava, Anil; Final Office Action in U.S. Appl. No. 12/325,664; Aug. 26, 2011; U.S. Patent and Trademark Office; Alexandria, VA.

Yuen, Keith; Non-Final Office Action in U.S. Appl. No. 12/200,720; Nov. 21, 2011; U.S. Patent and Trademark Office; Alexandria, VA.

Calle, Angel; Non-Final Office Action in U.S. Appl. No. 12/141,655; Feb. 17, 2011; U.S. Patent and Trademark Office; Alexandria, VA.

Arnold, William; Pattern Based SOA Deployment; Sep. 2007.

Calle, Angel; Final Office Action in U.S. Appl. No. 12/141,655; Aug. 29, 2011; U.S. Patent and Trademark Office; Alexandria, VA.

William C. Arnold et al.; U.S. Appl. No. 13/435,506, filed Mar. 30, 2012; entitled "Simplified Deployment Modeling.".

Issac Tuku Tecklu; Notice of Allowance and Fees Due; U.S. Appl. No. 12/181,737; Jun. 13, 2012; United States Patent and Trademark Office.

* cited by examiner

AUTOMATED DISCOVERY OF A TOPOLOGY OF A DISTRIBUTED COMPUTING ENVIRONMENT

CROSS-REFERENCE TO RELATED APPLICATIONS

This application is a continuation-in-part of U.S. application Ser. No. 12/181,737, filed Jul. 29, 2008, which is incorporated by reference herein in its entirety.

BACKGROUND

The present invention relates to distributed computing environments, and more particularly to developing and deploying software code in a distributed computing environment.

In a typical application development environment, a software architect creates software applications, e.g., using conventional development tools. However, the development environment from which a new application is developed is often different from an operations environment, e.g., a data center, which deploys the developed application. In this regard, architects within the operations environment are typically burdened with the responsibility of carrying the developed application into operations.

Development and deployment of a software solution often requires operation on existing resources (file, database, repository, device, etc.) to provide linkages to new resources. As an example, the modeling, configuration or execution of a deployment environment often requires the introspection of the existing environment(s) to find the states of the deployed resources and the links to the resources to be created. For instance, while defining a deployment model one may want to know the list of Java 2 Enterprise Edition (J2EE) application(s) or J2EE datasource(s) (from Sun Microsystems, Inc. of Mountain View Calif.) installed on a Websphere Application Server (from International Business Machines of Armonk, N.Y.). Likewise, a need may arise to find the existing database connections that are created in a development workspace such that the new database resource(s) can be created as needed. This scope of the search may need to be expanded to one or more types or even instances of the existing resources.

However, information regarding existing resources in which the software solution may be deployed may not be readily available. This may be because the deployment environment (e.g., a data center) may be provided by a third party separate from the person/organization developing the software. Additionally, configuration information necessary to deploy the developed application in the target operations environment is typically maintained in the form of non-integrated information, such as notes, word processing documents, spreadsheets, and other formats that lack a formal construct. This can result in difficulty for successful deployment of the application within the operations environment, especially when that entity is forced to deal with solving configuration problems that arise from incompatibilities in the requirements of the developed application and the capabilities provided by the target operations environment.

BRIEF SUMMARY

This invention provides an extensible means of defining the mechanism to find one or more type(s) or instance(s) of existing resources (files, databases, repositories, etc.) and automating their linkages to the artifacts to be created, based on the customizable matching rules.

In one embodiment of the invention, a method of modeling and configuration of a data center using a deployment model comprises discovering, by a computer, a current topology of the data center and creating, by the computer, one or more linkages between one or more discovered resources in the data center and one or more resources to be created. The current topology defines existing hardware and/or software resources in the data center.

Discovering the current topology may comprise discovering at least one of characteristics and dependencies of the identified resources. Discovering dependencies of the identified resources may comprise discovering at least one of capabilities, requirements, and relationships. Discovering requirements may comprise discovering at least one of dependency requirements, hosting requirements and member requirements. Discovering relationships may comprises discovering at least one of dependency relationships, hosting relationships, and member relationships.

The current topology may be discovered using environment-specific handlers. The environment-specific handlers may further convert the one or more discovered resources to a syntax and/or structure consumable by the deployment model. Customizable filters that define a scope and results of a search may be used to discover the current topology.

The method may further comprise receiving, by the computer, a user selection of one or more discovered resources. The one or more linkages are created based on the received user selection.

In addition to the method of modeling and configuration of a data center, as described above, other aspects of the present invention are directed to corresponding systems and computer program products for modeling and configuration of a data center.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
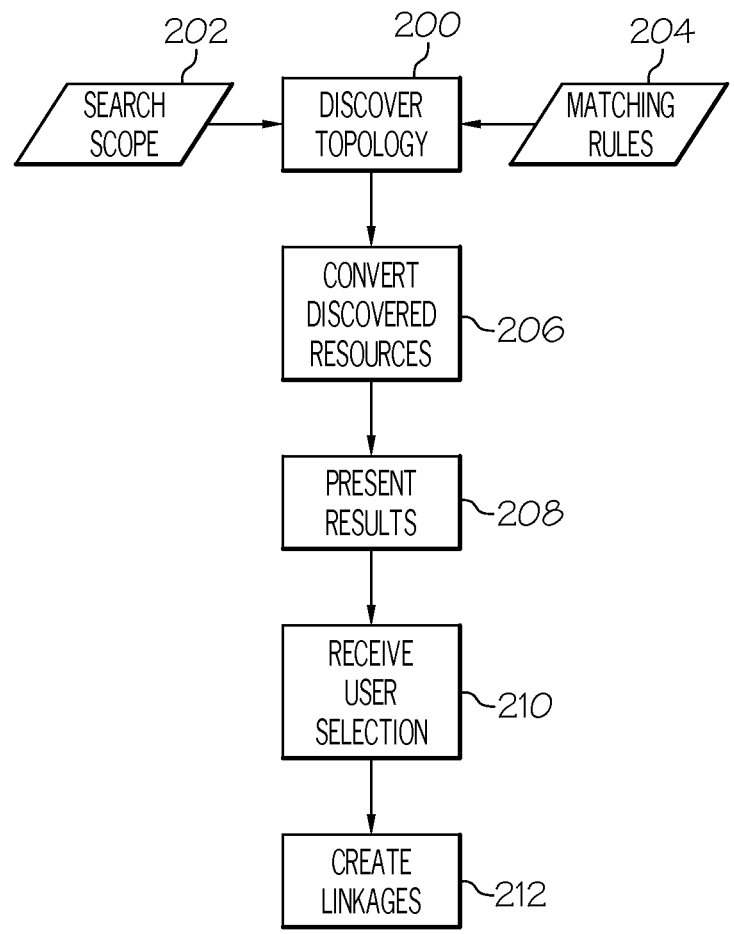
Figure 6:
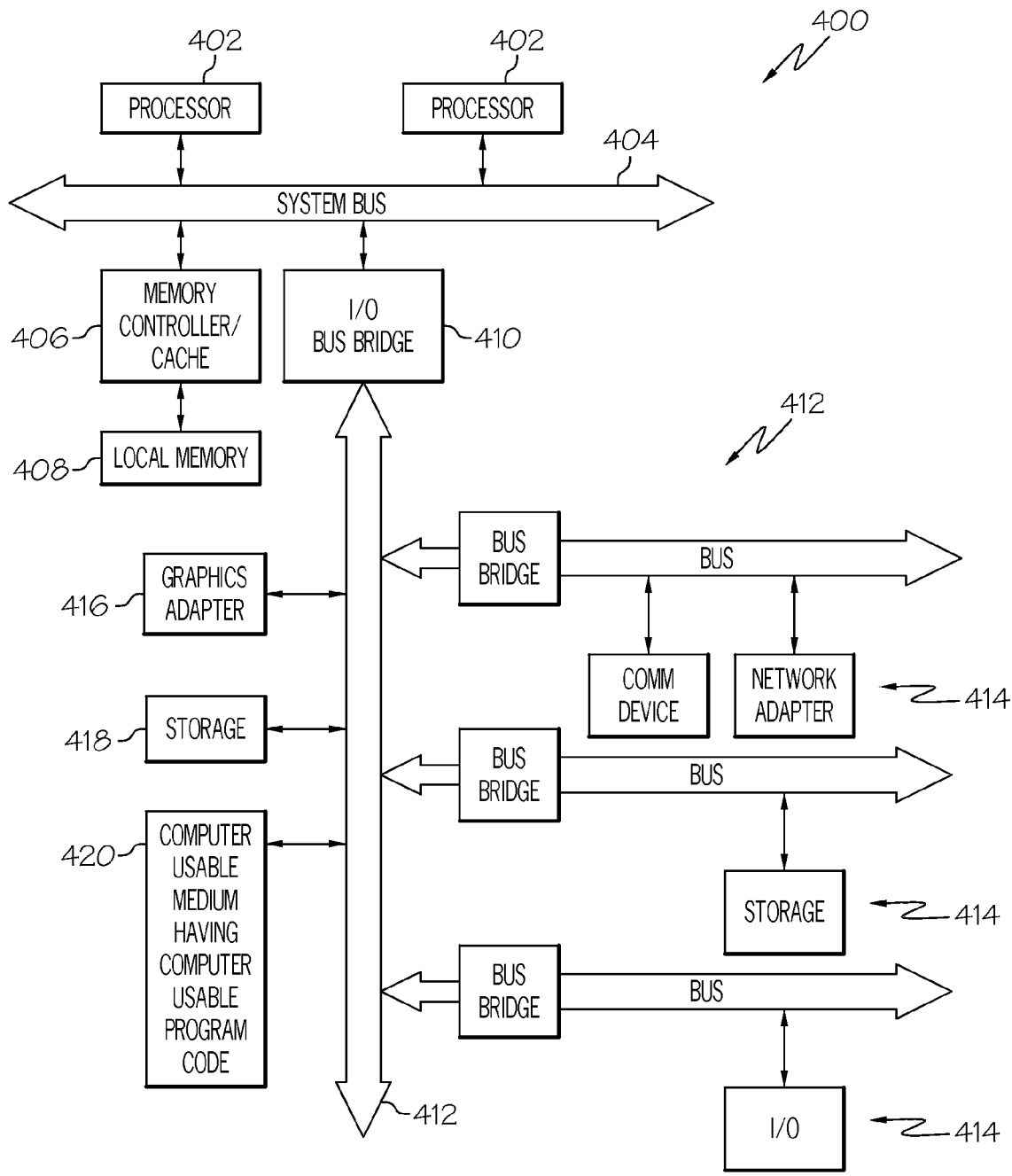

FIG. 5 is a flowchart of the operation of a method of modeling and configuration of a data center, in accordance with one embodiment of the present invention; and FIG. 6 is a block diagram of an exemplary computer system including a computer usable medium having computer usable program code embodied therewith, where the exemplary computer system is capable of executing a computer program product to implement one or more various aspects of the present invention.

DETAILED DESCRIPTION

Embodiments of the invention improve the usability of developing a software solution by providing an extensible means of defining the mechanism to find the one or more type(s) or instance(s) of existing resources (files, databases, repositories etc) and automating their linkages to the artifacts to be created, based on the customizable matching rules, for a highly connected model. Embodiments of the invention may:

(1) provide improved usability by providing to a user the list and state of the existing resource(s) from existing environment(s) and provide smart validation and resolution based on that information;

(2) allow for the contribution of an environment specific handler that allows for search scope to span resource type(s) and instance(s) by preserving the context and scope of the search;

(3) automatically orchestrate the execution of the environment specific handlers to find existing resource type(s) and instance(s) and create linkages to the resource(s) or instance(s) to be created;

(4) allow the definition of customizable filters that allow for setting the scope and results for the search such that the definition of the search is not tied to a specific type of resource; and (5) provide automated means to find existing resource(s) and create the linkages between the existing resource(s) and the resource(s) to be created based on customizable matching rules.

Figure 1:
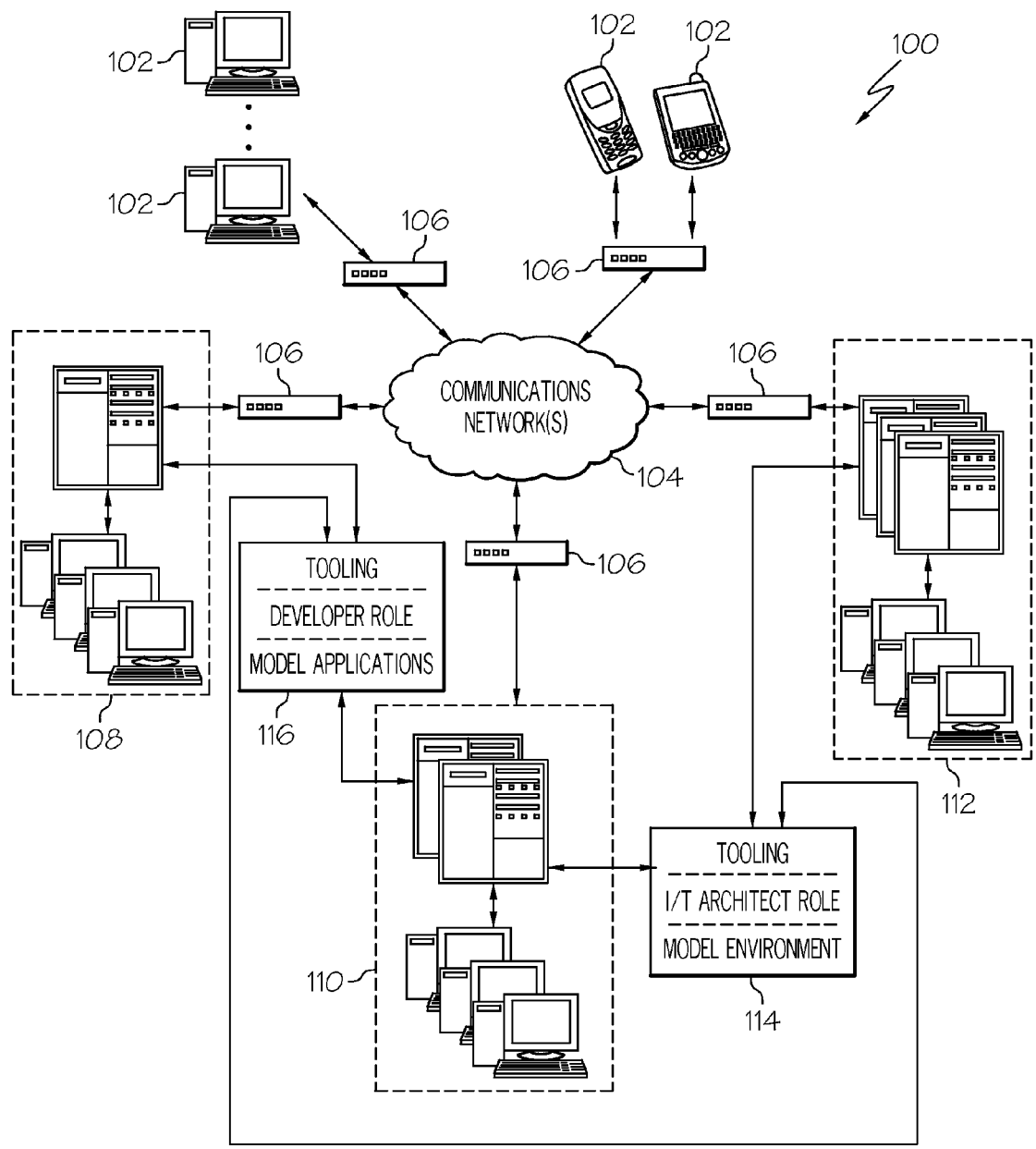
FIG. 1 is a schematic illustration of a computer system that links development, testing, deployment and end users across a network connection according to various aspects of the present invention.

Referring now to the drawings and particularly to FIG. 1, a general diagram of a distributed computing environment 100 is illustrated according to various aspects of the present invention. The computing environment 100 comprises a plurality hardware and/or software processing devices 102 that are linked together by a network 104. Typical processing devices 102 may include servers, personal computers, notebook computers, transactional systems, purpose-driven appliances, pervasive computing devices such as a personal data assistant (PDA), palm computers, cellular access processing devices, special purpose computing devices, printing and imaging devices, facsimile devices, storage devices and/or other devices capable of communicating over the network 104. The processing devices 102 may also comprise software, including applications and servers that interact with various databases, spreadsheets, structured documents, unstructured documents and/or other files containing information.

The network 104 provides communications links between the various processing devices 102, and may be supported by networking components 106 that interconnect the processing devices 102, including for example, routers, hubs, firewalls, network interfaces wired or wireless communications links and corresponding interconnections. Moreover, the network 104 may comprise connections using one or more intranets, extranets, local area networks (LAN), wide area networks (WAN), wireless networks (WIFI), the Internet, including the world wide web, and/or other arrangements for enabling communication between the processing devices 102, in either real time or otherwise, e.g., via time shifting, batch processing, etc.

In an illustrative arrangement, software developers referred to herein as software architects working within a software development environment 108 may develop a new software application and/or revise an existing software application. The developed application may comprise complex composites of multiple interdependent components that collectively implement flows of a corresponding business process. As such, before final deployment, the developed application is tested within a testing environment 110. Solutions architects working within the testing environment 110 may perform tests on the developed software and resolve issues related to configuration and implementation of the developed application. Accordingly, the server(s) and other hardware and software resources within the testing environment should be configurable to support the application being tested.

Once the solutions architects have verified the software as functional for implementing the intended business flow, the software may be released for deployment by an operations environment 112, such as a data center. Upon deployment of the software at the data center, end users can access the hosted content from across the network 104, e.g., using a corresponding network attached processing devices 102. In this regard, the development environment 108, the testing environment 110 and/or the operations environment 112 may be entities within the same organization, or they may be independent organizations.

Reference herein to an I/T architect, a software architect and/or a solutions architect are meant to imply "user roles" of individuals interacting with the platform. In this regard, the terms are not meant to require or imply independent and individual persons or predefined separate environments, but rather the role/part/nature of assigned tasks being performed. Similarly, although illustrated as distinct, the development environment 108, the testing environment 110 and the deployment environment 112 are meant to imply "environmental roles". In this regard, the environments do not require or imply discrete separately located resources, although they may be in practice.

Although the testing environment 110, (if implemented) may be utilized to verify that the developed software is functional as intended by design for implementing the corresponding business process, problems may still persist in the successful deployment of the application. For example, each component of an application to be deployed at a data center (or testing environment) is likely to have specific hosting and dependency requirements that are functional. As such, information technology (IT) architects, solutions architects, etc., of the testing environment 110 and/or operations environment 112 must manage their hardware and/or software resources to meet these functional requirements to ensure successful deployment of the application. This can be a time consuming task, which may eventually lead to a requirement to re-architect the data center and/or application.

For example, the data center selected for deployment of the application may not have the required version of a component to deploy the developed software, e.g., the wrong version of a database server, Java Deployment modeling platform, Enterprise Edition, etc. As further examples, the operations environment 112 may not support the required software such as a required database server, operating system, etc. Still further, the operations environment may not support the physical requirements of the application, e.g., memory required by the application as architected.

As discussed above, information regarding existing resources in which the software solution may be deployed may not be readily available. To enable proper deployment of the application, therefore, it may be necessary to discover the current topology of the data center. The current topology defines the existing hardware and/or software resources in the deployment environment (e.g., data center). It may then be necessary to create one or more linkages between the discovered resources in the data center and the resources to be created.

According to various aspects of the deployment modeling platform described in the above-incorporated co-pending patent application, integration and successful deployment of the application at the operations environment 112 is facilitated by using a deployment modeling platform that provides tooling for building extensible domain specific models that capture the relationships between business applications, deployment hardware and server software configurations, by describing the mapping between these traditionally isolated aspects of the distributed computing environment. In this regard, the tooling may be utilized to define checks, constraints, requirements and other attributes to establish relationships between domains.

The tooling enables the various architects to assume appropriate roles. For example, development architects may use the tooling to interact with the platform in a developer role to model application characteristics such as the business requirements and work flows to be implemented in target software. The development architects may also interact with the tooling to associate checks, constraints, capabilities and/or requirements to the modeled application characteristics of the target software.

I/T architects may use the tooling to interact with the platform in a IT architect role, e.g., to model resource requirements and capabilities of an operations environment, such as by modeling the hardware availability, capabilities and requirements, software availability, capabilities and requirements, hardware and software interoperability, and other factors necessary to successfully deploy target software. In this regard, the IT architect may model the resource requirements and capabilities of a deployment environment in which the target software modeled by the developer is to be deployed and to associate restrictions and requirements to the modeled resource requirements and capabilities.

Solutions architects may utilize the tooling to interact with the platform in a solutions role, e.g., for problem resolution and integration, such as to resolve issues related to mapping between modeled application characteristics created by the software architects and modeled resource requirements and capabilities of the operations environment. For example, a solutions architect may bind the modeled applications characteristics to the associated modeled resource requirements and capabilities and resolve interoperability issues that would prevent deployment of the target software on the associated deployment environment. Depending upon the selected role, the tooling may selectively show and/or hide certain features, data, options, etc., which are not relevant to the associated role of the user. The various roles and models will be described in greater detail herein.

As an illustrative example, I/T architects may utilize a first tooling 114 of a deployment modeling platform to model the target hosting and/or testing environment(s). Software architects may utilize a second tooling 116 of the deployment modeling platform to model the architecture for application components and their requirements against the model(s) of the target hosting environments. Fulfillment of developed and modeled requirements may be necessary by each target environment, such as development, testing and production to deploy the application. As such, the solutions architect binds the models created by the I/T architect and/or the software architect and resolves restrictions, requirements, etc.

Figure 2:
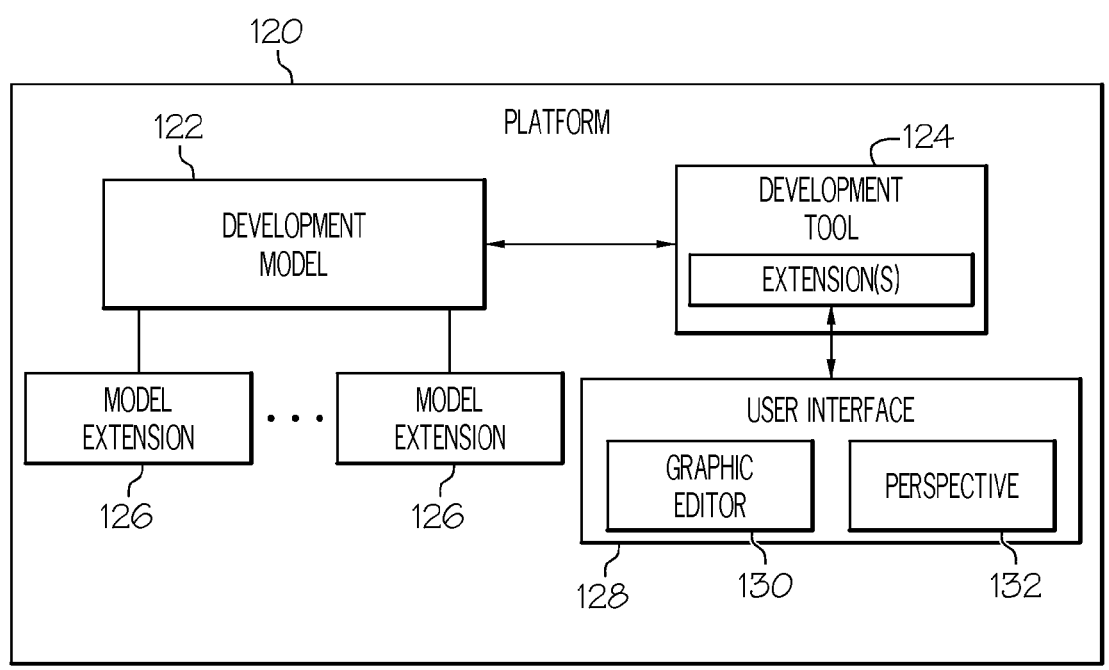
FIG. 2 is a block diagram of an extension deployment modeling platform according to various aspects of the present invention.

Referring to FIG. 2, a deployment modeling platform 120 comprises a deployment model 122 and a development tool 124 that provide an extensible deployment modeling framework. The deployment modeling platform 120 allows the implementation of a formal construct that defines simple concepts that capture requirements, capabilities and their relationships, e.g., business and physical requirements, capabilities and their relationships for an enterprise architecture. The fundamental concepts of the deployment model 122 may thus be simplified such that there are no complex types with complex relationships that require tools and other consumers to fully understand all of the types and their relationships. Rather, the deployment model 122 comprises a "Unit model" framework that defines a core definition that can be used as a foundation to build specific instances of domain representations into corresponding models as will be described in greater detail herein. The formal construct provides a common language and allows the construction of an extensible type system. In this regard, "extensions" to the formal construct may be utilized to represent specific aspects of distributed computing environments that the core deployment modeling platform was not initially aware of. Examples of extensions are also described in greater detail herein.

Moreover, the deployment modeling platform 120 provides modeling, structure and governance of design, development, requirements and other parameters necessary to comprehend solutions to integration problems. Thus for example, the deployment model 122 may be implemented so as to define simple concepts that capture the structural capabilities and requirements of elements in an information technology system, such as application components, middleware software, hardware, networking and/or other business and physical requirements, capabilities and their relationships for an Enterprise Architecture.

For example, the deployment modeling platform 120 may operate on the fundamental concepts presented in the Topology Definition Model (TDM). As such, the TDM may serve as the formal construct underpinning the deployment modeling platform 120. However, other models may alternatively be implemented so long as a core set of modeling concepts can be operated upon in a repeatable and reliable fashion, e.g., by understanding the core structures and their relationships.

The deployment modeling platform 120 defines an extension model framework that provides several "model extensions" 126. The model extensions 126 extend the deployment model 122, such as to further refine instances of the unit model for specific domain representations, by adding and/or refining domains to the model, etc. Other extensions may be subsequently implemented to bridge the gap from environments that contain content to be deployed or already deployed but that is described in other model(s) or format(s). This allows for content from other models and formats to be integrated into an instance of the deployment model 122. Thus, extensions to the development tool 124 may perform capabilities such as custom validation, publishing and/or exporting of new and existing artifacts in a holistic manner.

According to various aspects of the present invention, the deployment model 122 exposes a set of "extension points" for customizing the deployment modeling experience via the model extensions 126 based on different domains and/or contexts. According to various aspects of the present invention, the model extensions 126 may be implemented using existing technology, such as the Eclipse extension point mechanism or any other suitable extension point mechanism. For example, "extension points" as used herein, are a concept specific to Eclipse-based applications. Using a declarative extension mechanism that allows software contributions to be linked in following well defined contracts and patterns of behavior, points of extensibility are defined which allow third party contributors to act on the model seamlessly within the tooling environment without the tool vendor being aware of their contributions.

The exposure of the extension points allows the development tool 124 to create relationships that can be validated based on requirement and capability matching within the deployment model 122. This frees the deployment modeling platform 120 from completely understanding the domains (i.e., model extensions) used in the deployment modeling platform model 122 and their relationships with other domains. However, the exposure of extension points is not strictly limited to validation. For example, the extension points may be used for publishing, exporting, palette configuration, leveraging an extensible type system, etc. In embodiments of the present invention, the extension points are used for discovering resources and creating linkages to the discovered resources.

The user interface 128 comprises an editor that is utilized to create composite application models. As an example, a user may interact with the user interface 128 to manipulate instances of the common core model for specific domains to create the desired composite application model. The development tool 124 may further implement an extension model framework that allows users, e.g., via the graphical user interface 128, to define extensions to an instance of a core unit. The extensions represent different semantics and attributes corresponding to specific aspects of modeled domain representations. Similarly, extension points may be utilized to integrate the development tool 124 with the underlying model, including its extensions.

The deployment modeling platform 120 may also include a graphical user interface (UI) 128. For example, the graphical user interface 128 may comprise an extendible graphical editor 130 for visualizing models and may be used to implement views for operators implementing various roles, e.g., the first tooling 114 and second tooling 116 described with reference to FIG. 1. Thus, for example, a user implementing a first role, such as that of an applications architect, may create a specification model. A user implementing a second role, such as an I/T architect can drag and drop the specification model, possibly in another instance of the graphical editor, to conform the specification model to a host link. The user interface 128 may also include a perspective 132 for organizing related views, such as navigators, resource explorers, problem views, and property views. There may be UI extensions for each model extension.

As noted above, the deployment modeling platform 120 may operate on the fundamental concepts presented in the TDM model. For example, the deployment modeling platform 120 may further be utilized to leverage many domain extensions that have been defined as part of a core delivery to create topologies that represent a deployment of applications into an infrastructure. Moreover, custom extensions may be utilized or created to make the development tool 124 aware of other resources and capabilities, such as Configuration Management Databases (CMDB), e.g., to translate to and from the CMDB and TDM instances. TDM also has extensions that allow the publishing of a topology, e.g., using a provisioning manager.

Figure 3:
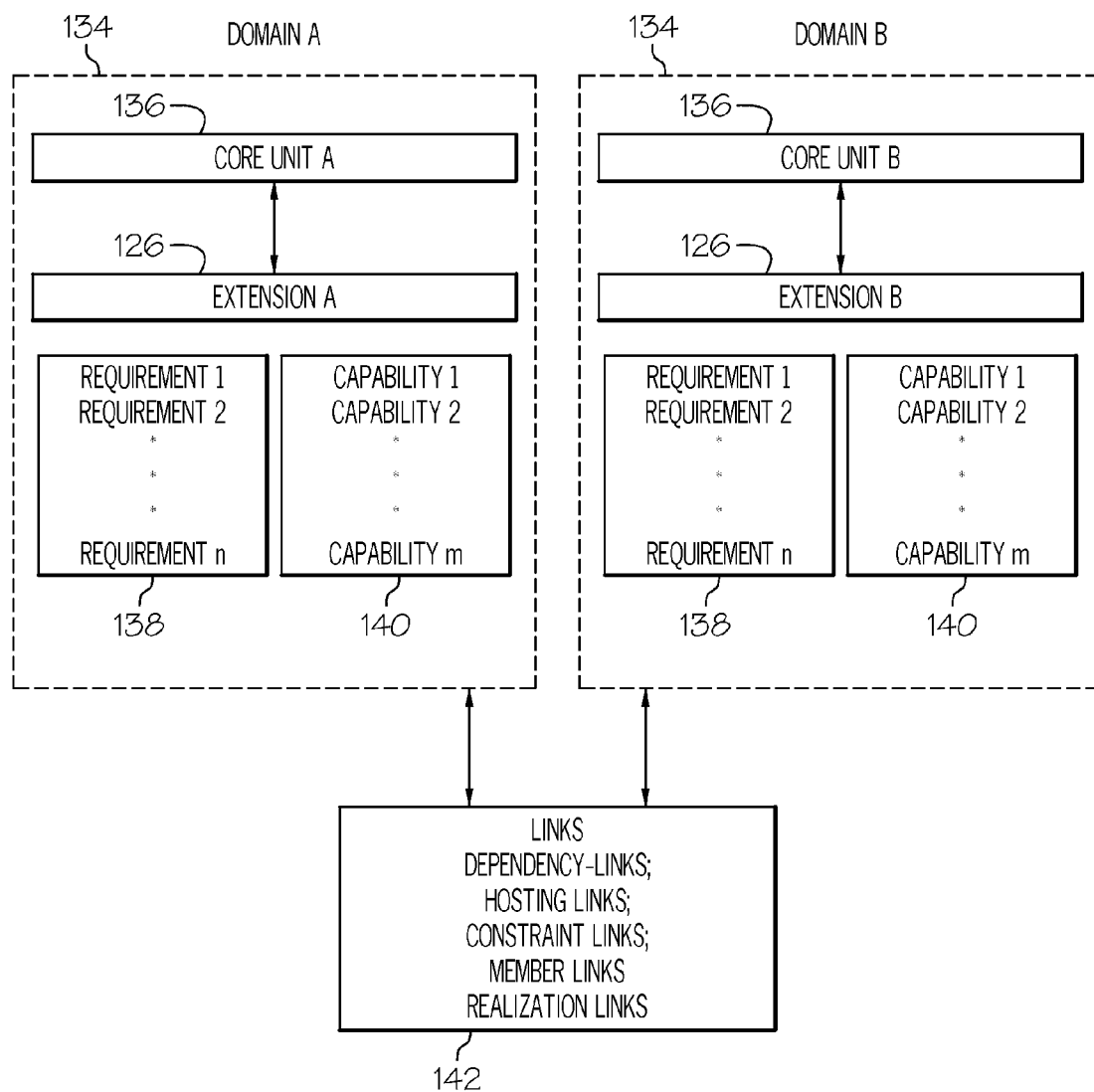
FIG. 3 is a block diagram of Unit components according to various aspects of the present invention.

Referring to FIG. 3, the deployment model 122 may utilize a component referred to herein as a "Unit" (or "unit model") 134. The unit 134 comprises a core unit 136. The deployment modeling platform 120 also allows extending of the core Unit 136, e.g., using the model extensions 126 to contribute specialized behavior support to introduce other domains into the deployment model 122. This enhances the ability of the development tool 120 to build more elaborate models. For example, exemplary domains such as J2EE, Database 2 (DB2) distributed by International Business Machines of Armonk, N.Y., and WebSphere, also by International Business Machines, may provide statically defined Units that have different semantics and attributes/properties defined on the domain.

Each Unit 134 may also comprise one or more "Requirements" 138 and/or one or more "Capabilities" 140. The model is build upon the fundamental concept that the collection of Requirements 138 of a corresponding Unit 134 must be fulfilled in order to deploy that Unit 134. According to various aspects of the present invention, the Requirements 138 may comprise "required" requirements and "optional" requirements. Under this (or a similar arrangement) only the "required" requirements must be fulfilled in order to deploy the unit.

A Requirement 138 is fulfilled by matching that Requirement 138 against one or more Capabilities 140 of other Units 134 using various "links" 142. Exemplary links may comprise Dependency Links, Hosting Links, Constraint Links and Member Links. In this regard, other "link" functions may additionally/alternatively be implemented. Thus, as noted above, relationships may be created that can be validated based on requirement and capability matching within the model.

Thus, as an illustrative example, the deployment modeling platform may be expressed as several units, where each unit consumes services to provide capabilities. As yet another illustrative example, a data center may register information in a model that defines the requirements and capabilities of the data center to host certain applications. However, structures and physical and logical organizations are not constrained to a single domain.

The shared modeling structure and a platform that operates on this model instance allow the platform and model to be extended in a dynamic manner to manipulate and reason about disconnected technology domains. This allows users with different roles in different groups in the organization to work with aspects of the model that are specific to their technology area. Solution architects can work with domains that span multiple technologies and resources from both software and operations teams. Thus, as an example, notes, emails, and spreadsheets are not required for transferring information between typically disconnected domains. Rather, information is conveyed across various domains via the models and associated links. This allows, for example, information to be shared between development and deployment operations, as well as for applications to be developed in a manner that is checked against its target deployment environment, reducing the likelihood that the application will need to be re-architected.

Figure 4:
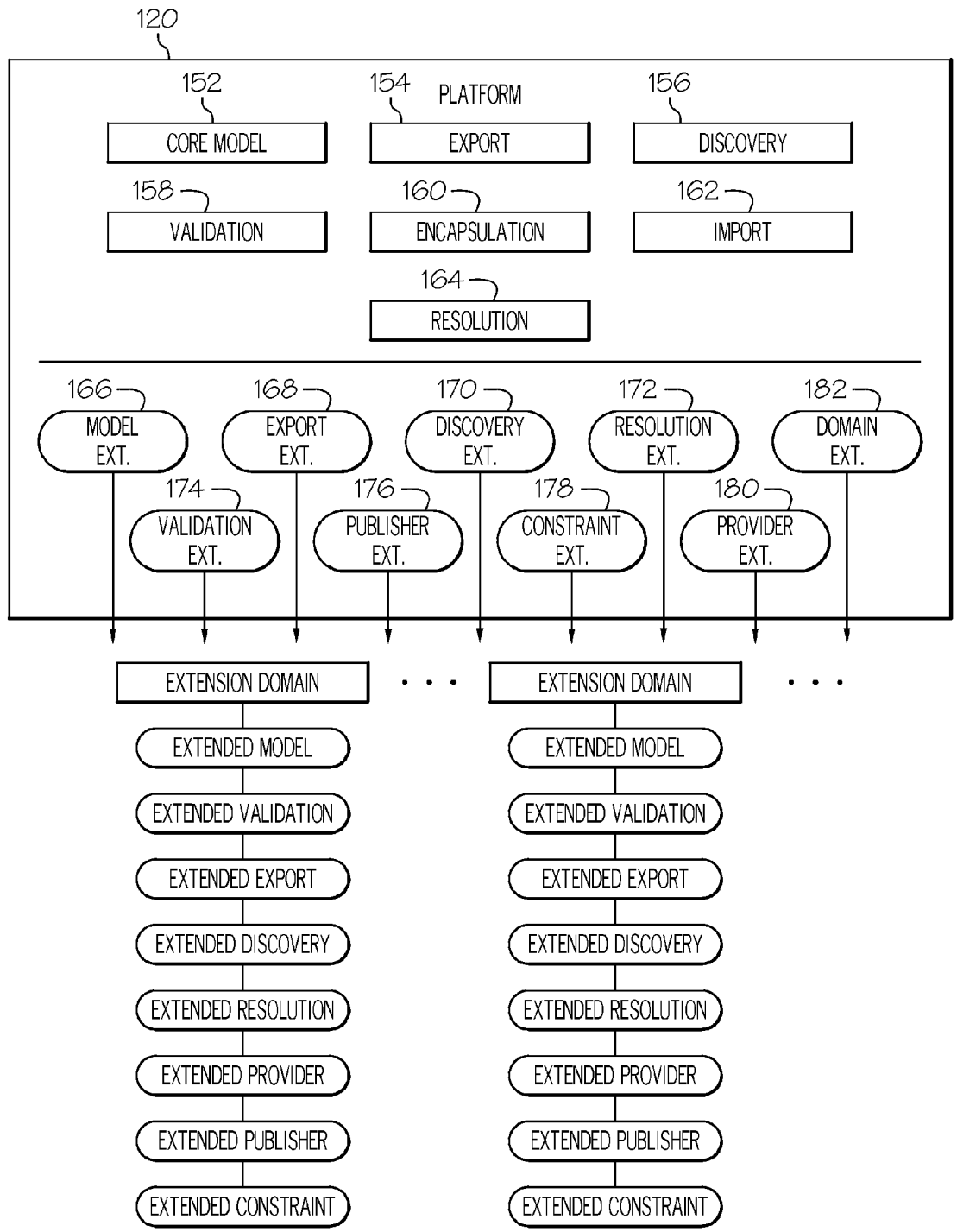
FIG. 4 is a block diagram of features and extensions of the deployment modeling platform of FIG. 2 according to various aspects of the present invention.

Referring to FIG. 4, another schematic view of the deployment modeling platform 120 illustrates the model extension framework in greater detail. The illustrated deployment modeling platform 120 includes a core model 152, which provides the core unit structure that can be extended by the domains in which various aspects of the present invention are to be utilized. In this regard, the core model 152 may be analogous to the unit 136 described with reference to FIG. 3. The deployment modeling platform 120 may also include a plurality of features/functions, e.g., that form extensions of the development tool 124 that enhance and facilitate the application of the core model to the domains of interest.

For example, the illustrated deployment modeling platform 120 may include an Export function 154, a Validation function 158, an Encapsulation function 160, an Import function 162, and a Resolution function 164. These functions are described in more detail in the above-incorporated co-pending patent application.

Importantly, the deployment modeling platform 120 may also include a Discovery function 156 that interacts, for example, with the user interface 128 to allow a user to configure discovery mechanisms for automatically locating and/or resolving requirement matches during validation operations. The use and operation of the Discovery function is described in more detail below.

As illustrated, the deployment modeling platform 120 further allows for a plurality of extensions to the core model 152, e.g., to contribute specialized behavior support. These extensions correspond to the extensions described with reference to FIG. 2. For example, as illustrated, the deployment modeling platform 120 may include a Model extension 166, an Export extension 168, a Resolution extension 172, a Validation extension 174, a Publisher extension 176, a Constraint extension 178, a Provider extension 180, and a Domain extension 182. These extensions are described in more detail in the above-incorporated co-pending patent application.

Importantly, the deployment modeling platform 120 may also include a Discovery extension 170. The Discovery extension 170 provides an extension point that allows for the registration of automatic discovery mechanisms for resolving requirement matches. The type of discoverer registered can achieve the matching of requirements in any fashion it wishes. Moreover, an additional unit discoverer extension point may be implemented that is used in conjunction with the discovery mechanisms that allows for the discovery of a unit which is not defined in the -model instance. Thus, matches for requirements can be located within an environment not modeled directly by the tool, e.g., infrastructure. The use and operation of the Discovery extension is described in more detail below.

Referring now to FIG. 5, a flowchart of the operation of a method of modeling and configuration of a data center is illustrated in accordance with one embodiment of the present invention. A current topology of a data center is discovered (block 200), based on a search scope (block 202) and matching rules (block 204) defined by customizable filters. The filters may be customized to define, for example, servers of a specific type on a data center. Similarly, the filters may be customized for discovering resources that (including but not limited to): are in a particular state; are of a particular type; that have a specific set of capabilities; that have a specific set of requirements; that can host a given unit; that can contain a given unit as a member; that can satisfy a dependency requirement of a given unit; or any combination of the above. The topology of a data center defines the existing hardware and/or software resources in the data center. Discovering the current topology involves discovering characteristics and/or dependencies of the identified resources. The dependencies of the identified resources comprise capabilities, requirements, and/or relationships. The requirements comprise dependency requirements, hosting requirements, and/or member requirements. The relationships comprise dependency relationships, hosting relationship, and/or member relationships. The topology is discovered using environment-specific handlers. For example, different handlers will be used for a J2EE environment and for a database environment. The environment-specific handlers convert the discovered resources to a syntax and/or structure that is consumable by the deployment model (block 206).

The discovered topology may be presented to the user (block 208), typically using the Unified Modeling Language to present the information to the user. The user may then make a selection of one or more of the discovered resources (block 210) to be included in a model instance, and then one or more linkages may be created (block 212) between the one or more selected resources and each other, and/or between the one or more selected resources and the other resources already in the model instance.

Embodiments of the present invention define extensions points and interfaces to enable the list of existing resources to be found from the existing environment(s). This enables a user to create extensions to define the information the user desires to discover. A service may also be provided that orchestrates the execution of the environment specific handlers to find existing resource type(s) and instance(s) and create linkages to the resource(s) or instance(s) to be created. In the example implementation of defining and configuring the deployment topology, this service may be invoked whenever validation is executed to present user with errors and possible resolutions. The results of the search are typically scoped to the context of the validation.

When a user requests for a creation of a new type of linkage, such as a host linkage, the possible options include the matching resource(s) in the current deployment model and also the existing environments for which the handler is contributed. A distinction is also made between the resource in the deployment model or the existing resource from the environment. A pre-defined set of these rules relevant to the deployment modeling may be provided along with preset filters that scope the search result. Once user selects an existing resource(s) as the host the new unit for the host is created in the topology and a host link is also created to it. The invention also allows for the orchestration of these environment specific handlers for automated detection of existing resource(s) by invoking it during the validation.

Extension Point Definition

In one embodiment of the invention, the following extension point allows for the contribution of an environment specific handler for discovering the deployment topology:

```
<element name="discoverer">
    <annotation>
        <appInfo>
            <meta.element labelAttribute="name"/>
        </appInfo>
        <documentation>
            This extension can be used to contribute a provider to
            discover the resources that are similar to a unit based on the
            matching set of capabilities or requirements.
        </documentation>
    </annotation>
    <complexType>
        <attribute name="name" type="string" use="required">
            <annotation>
                <documentation>
                    Provide a translatable name.
                </documentation>
                <appInfo>
                    <meta.attribute translatable="true"/>
                </appInfo>
            </annotation>
        </attribute>
        <attribute name="description" type="string">
            <annotation>
                <documentation>
                    Provide a translatable description.
                </documentation>
                <appInfo>
                    <meta.attribute translatable="true"/>
                </appInfo>
            </annotation>
        </attribute>
        <attribute name="class" type="string" use="required">
            <annotation>
                <documentation>
                    The implementation of the discoverer.
                </documentation>
                <appInfo>
                    <meta.attribute kind="java" basedOn=
"com.ibm.ccl.soa.deploy.core.TopologyDiscoverer"/>
                </appInfo>
            </annotation>
        </attribute>
    </complexType>
</element>
```

Unit Discoverer Extension

In one embodiment of the invention, the following extension allows for the contribution of an environment specific handler for a unit within a deployment topology:

```xml
<element name="unitDiscoverer">
    <annotation>
        <appInfo>
            <meta.element labelAttribute="name"/>
        </appInfo>
        <documentation>
            Provide a list of unit discoverers. An example is the find the other units
which this unit requires to fulfill its hosting capabilities.
        </documentation>
    </annotation>
    <complexType>
        <sequence>
            <element ref="inputEnablement"/>
            <element ref="outputEnablement"/>
        </sequence>
        <attribute name="name" type="string" use="required">
            <annotation>
                <documentation>
                    Provide a translatable name that can be exposed to users in
dialogs and wizards.
                </documentation>
                <appInfo>
                    <meta.attribute translatable="true"/>
                </appInfo>
            </annotation>
        </attribute>
        <attribute name="description" type="string">
            <annotation>
                <documentation>
                    Provide a translatable description that can be used to
explain to the user what source elements may be adapted to be displayed in the Topology Editor.
                </documentation>
                <appInfo>
                    <meta.attribute translatable="true"/>
                </appInfo>
            </annotation>
        </attribute>
        <attribute name="class" type="string" use="required">
            <annotation>
                <documentation>
                    The implementation of the unit discoverer.
                </documentation>
                <appInfo>
                    <meta.attribute kind="java" basedOn=
"com.ibm.ccl.soa.deploy.core.UnitDiscoverer"/>
                </appInfo>
            </annotation>
        </attribute>
    </complexType>
</element>
```

Example Extension

In one embodiment of the invention, the following example extension allows existing resource(s) to be found within Eclipse workspace configurations, and linkages to the resources to be created in a deployment topology:

```xml
<extension point="com.ibm.ccl.soa.deploy.core.topology">
    <discoverer
        class="com.ibm.ccl.soa.deploy.ide.internal.discoverer.-
        IdeTopologyDiscoverer"
        description="%extension.ideTopologyDiscoverer.description"
        name="%extension.ideTopologyDiscoverer" />
</extension>
```

Example Interface

In one embodiment of the invention, the following interface is implemented by the environment specific handler to discover the deployment topology:
package com.ibm.ccl.soa.deploy.core;

import java.util.List;
/**
* Provides the interface for client extensions to provide a discoverer for -continued

```
* topology artifacts. Clients who extend
* <b>com.ibm.ccl.soa.deploy.core.topology/discoverer</b> must
* extend this class.
*
* @since 1.0
*
*/
public abstract class TopologyDiscoverer {
    /**
    * This implementation of this method should specify whether the
    * discovery provider is capable of serving the request based on the
    * contents set in the filter.
    * @param filter
    *     the input filter instance that has the filter criteria.
    * @return true, if the provider can fulfill the criteria.
    *
    */
    public abstract boolean canDiscover(DiscoveryFilter filter);
    /**
    * The implementation of this method should return a list of the unit
    * decriptors based on the discovery criteria.
    *
    * @param filter
    *     the input filter instance that has the filter criteria.
```

```
* @return the list of UnitDescriptor based on the matching criteria.
* @see UnitDescriptor
*/
public abstract List<UnitDescriptor> findAll(DiscoveryFilter filter);
/**
* Determines if two units are the "same" unit. Two units are the same
* if they would be represented by the same {@link Unit} in the
* same {@link Topology}. The units compared need not be in
* the same {@link Topology}.
*
* @param unit1
*      one unit
* @param unit2
*      the other unit
* @return true if the units are the same unit; false if not or if not
    determinable
*/
public abstract boolean isDiscoveredUnitSame(Unit unit1, Unit unit2);
}
```

Example Filter

In one embodiment of the invention, the following filter is used to define the search scope and the result for the deployment topology:

package com.ibm.ccl.soa.deploy.core;

```
import java.util.Arrays;
import java.util.List;
import org.eclipse.core.runtime.IProgressMonitor;
import org.eclipse.core.runtime.NullProgressMonitor;
/**
* @since 1.0 This class provides the ability to set the various filter types for the discoverer.
* Based on the filters set in this object, the discovery service provider can filter the
* elements for return.
*/
public class DiscoveryFilter {
    /**
    * initial install state(s) of the unit to be matched
    */
    private List initInstallState;
    /**
    * source unit to be used as a base for the discovery criteria scope the units that match the
    * type of this unit.
    */
    private Unit unit;
    /**
    * source classes to be used as a base for the discovery criteria scope the units that match
    * the type of the classes in this array.
    */
    private Class [ ] unitTypes ;
    /**
    * list of capabilities to be used in the discovery criteria scope the units that match all of
    * these capabilities in the list If this is set, then the capabilities of the source unit are
    * ignored in discovery.
    */
    private List capabilities;
    /**
    * list of requirements to be used in the discovery criteria scope the units that match all of
    * these requirments in the list. If this is set, then the requirements of the source unit are
    * ignored in discovery.
    */
    private List requirements;
    /**
    * a choice whether discovery must consider only units that are direct hosting
    * relationships
    */
    private Boolean directHosting;
    /**
    * flag indicating that an existing dependency link should be followed
    */
    private Boolean followDependency;
    /**
    * flag indicating that an existing member link should be followed
    */
    private Boolean useExistingMemberLink;
    /**
    * flag indicating that membership links should be investigated
    */
    private Boolean membership;
    /**
    * a choice whether discovery must consider units from current topology in use for
    * discovery
    */
    private Boolean addTopologyToScope;
    /**
    * Current "target" topology for units once discovered. Typically the topology being
    * edited; the "current" topology.
    */
```

```
private Topology topology;
/**
 * scope the discovery only to the units that are hosted by the hosts in this list; If this is
 * set, then the host of the source unit are ignored in discovery.
 */
private List hosts;
/**
 * Monitor for discovery progress.
 */
private IProgressMonitor monitor;
/**
 * @return the list of capabilities used in the discovery criteria
 */
public List getCapabilities( ) {
   return capabilities;
}
/**
 * @param capabilities
 */
public void setCapabilities(List capabilities) {
   this.capabilities = capabilities;
}
/**
 * @return whether to use direct hosting in the discovery criteria or scope the criteria to
 * drill down
 */
public Boolean isDirectHosting( ) {
   return directHosting;
}
/**
 * @param followDependency
 */
public void setFollowDependency(Boolean followDependency) {
   this.followDependency = followDependency;
}
/**
 * @return the list of hosts used in the discovery criteria
 */
public List getHosts( ) {
   return hosts;
}
/**
 * @param hosts
 */
public void setHosts(List hosts) {
   this.hosts = hosts;
}
/**
 * @return scope the discovery based on the install state
 */
public List getInitInstallState( ) {
   return initInstallState;
}
/**
 * @param initInstallState
 */
public void setInitInstallState(List initInstallState) {
   this.initInstallState = initInstallState;
}
/**
 * @return the list of requirements used in the discovery criteria
 */
public List getRequirements( ) {
   return requirements;
}
/**
 * @param requirements
 */
public void setRequirements(List requirements) {
   this.requirements = requirements;
}
/**
 * @return the unit used to scope the discovery
 */
public Unit getUnit( ) {
   return unit;
}
/**
 * @param unit
```

```
*/
public void setUnit(Unit unit) {
   this.unit = unit;
}
/**
 * @return the types like EarModule.class, WebModule.class to scope the result
 */
public Class [ ] getUnitTypes( ) {
   return unitTypes;
}
/**
 * @param unitTypes
 * specify the types like EarModule.class, WebModule.class to scope the result
 */
public void setUnitTypes(Class [ ] unitTypes) {
   this.unitTypes = unitTypes;
}
/**
 * @return whether to use direct hosting in the discovery criteria or scope the criteria to
 * drill down
 */
public Boolean isDirectDependency( ) {
   return followDependency;
}
/**
 *
 * @param directHosting
 */
public void setDirectHosting(Boolean directHosting) {
   this.directHosting = directHosting;
}
/**
 * @return flag indicating whether or not search should follow existing member link
 */
public Boolean isExistingMemberLink( ) {
   return useExistingMemberLink;
}
/**
 * Set flag indicating whether or not search should follow existing member link
 *
 * @param useExistingMemberLink
 * flag
 */
public void setUseExistingMemberLink(Boolean useExistingMemberLink) {
   this.useExistingMemberLink = useExistingMemberLink;
}
/**
 * @return flag indicating whether or not search should focus on member links
 */
public Boolean isMembership( ) {
   return membership;
}
/**
 * Set flag indicating whether or not search should focus on members links.
 *
 * @param membership
 * flag
 */
public void setMembership(Boolean membership) {
   this.membership = membership;
}
/**
 * whether the topology units needs to be added to scope
 *
 * @return Returns the addTopologyToScope
 */
public Boolean isAddTopologyToScope( ) {
   return addTopologyToScope;
}
/**
 * @param addTopologyToScope
 * The addTopologyToScope to set.
 */
public void setAddTopologyToScope(Boolean addTopologyToScope) {
   this.addTopologyToScope = addTopologyToScope;
}
/**
 * @return Returns the topology.
 */
```

```
public Topology getTopology( ) {
    return topology;
}
/**
 * @param topology
 * The topology to set.
 */
public void setTopology(Topology topology) {
    if (topology != null) {
        this.topology = topology.getEditTopology( );
    } else {
        this.topology = null;
    }
}
/**
 * Sets the progress monitor used to track discovery progress and cancellation.
 * <p>
 * If the monitor is set to null, then the next call to {@link #getProgressMonitor( )}will
 * create a {@link NullProgressMonitor}.
 *
 * @param monitor
 * the progress monitor (may be null).
 */
public void setProgressMonitor(IProgressMonitor monitor) {
    this.monitor = monitor;
}
/**
 * @return the progress monitor used to cancel long-running discovery queries (never
null).
 */
public IProgressMonitor getProgressMonitor( ) {
    if (monitor == null) {
        monitor = new NullProgressMonitor( );
    }
    return monitor;
}
/**
 * Returns a hash code value for the array
 *
 * @param array
 * the array to create a hash code value for
 * @return a hash code value for the array
 */
private static int hashCode(Object[ ]array) {
    final int PRIME = 31;
    if (array == null) {
        return 0;
    }
    int result = 1;
    for (int index = 0; index <array.length; index++) {
        result = PRIME * result + (array[index] == null ? 0 :
array[index].hashCode( ));
    }
    return result;
}
/*
 * (non-Javadoc)
 *
 * @see java.lang.Object#hashCode( )
 */
public int hashCode( ) {
    final int PRIME = 31;
    int result = 1;
    result = PRIME * result + (addTopologyToScope == null ? 0 :
addTopologyToScope.hashCode( ));
    result = PRIME * result + (capabilities == null ? 0 : capabilities.hashCode( ));
    result = PRIME * result + (directHosting == null ? 0 : directHosting.hashCode( ));
    result = PRIME * result + (followDependency == null ? 0 :
followDependency.hashCode( ));
    result = PRIME * result + (hosts == null ? 0 : hosts.hashCode( ));
    result = PRIME * result + (initInstallState == null ? 0 :
initInstallState.hashCode( ));
    result = PRIME * result + (membership == null ? 0 : membership.hashCode( ));
    result = PRIME * result + (requirements == null ? 0 : requirements.hashCode( ));
    result = PRIME * result + (topology == null ? 0 : topology.hashCode( ));
    result = PRIME * result + (unit == null ? 0 : unit.hashCode( ));
    result = PRIME * result + DiscoveryFilter.hashCode(unitTypes);
    result = PRIME * result
        + (useExistingMemberLink == null ? 0 :
```

```
useExistingMemberLink.hashCode( ));
    return result;
}
/*
 * (non-Javadoc)
 *
 * @see java.lang.Object#equals(java.lang.Object)
 */
public boolean equals(Object obj) {
    if (this == obj) {
        return true;
    }
    if (obj == null) {
        return false;
    }
    if (getClass( ) != obj.getClass( )) {
        return false;
    }
    final DiscoveryFilter other = (DiscoveryFilter) obj;
    if (addTopologyToScope == null) {
        if (other.addTopologyToScope != null) {
            return false;
        }
    } else if (!addTopologyToScope.equals(other.addTopologyToScope)) {
        return false;
    }
    if (capabilities == null) {
        if (other.capabilities != null) {
            return false;
        }
    } else if (! capabilities.equals(other.capabilities)) {
        return false;
    }
    if (directHosting == null) {
        if (other.directHosting != null) {
            return false;
        }
    } else if (!directHosting.equals(other.directHosting)) {
        return false;
    }
    if (followDependency == null) {
        if (other.followDependency != null) {
            return false;
        }
    } else if (!followDependency.equals(other.followDependency)) {
        return false;
    }
    if (hosts == null) {
        if (other.hosts != null) {
            return false;
        }
    } else if (!hosts.equals(other.hosts)) {
        return false;
    }
    if (initInstallState == null) {
        if (other.initInstallState != null) {
            return false;
        }
    } else if (!initInstallState.equals(other.initInstallState)) {
        return false;
    }
    if (membership == null) {
        if (other.membership != null) {
            return false;
        }
    } else if (!membership.equals(other.membership)) {
        return false;
    }
    if (requirements == null) {
        if (other.requirements != null) {
            return false;
        }
    } else if (!requirements.equals(other.requirements)) {
        return false;
    }
    if (topology == null) {
        if (other.topology != null) {
            return false;
        }
```

```
      } else if (!topology.equals(other.topology)) {
         return false;
      }
      if (unit == null) {
         if (other.unit != null) {
            return false;
         }
      } else if (!unit.equals(other.unit)) {
         return false;
      }
      if (!Arrays.equals(unitTypes, other.unitTypes)) {
         return false;
      }
      if (useExistingMemberLink == null) {
         if (other.useExistingMemberLink != null) {
            return false;
         }
      } else if (!useExistingMemberLink.equals(other.useExistingMemberLink)) {
      return false;
      }
      return true;
   }
}
```

Referring to FIG. 6, a block diagram of a data processing system is depicted in accordance with the present invention. A data processing system 400, such as may be utilized to implement embodiments of the present invention, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present invention, for example, to implement aspect of any of the methods, computer program products and/or system components illustrated in foregoing figures.

As will be appreciated by one skilled in the art, the present invention may be embodied as a system, computer-implemented method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be punch-card, paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

"Computer" or "computing device" broadly refers to any kind of device which receives input data, processes that data through computer instructions in a program, and generates output data. Such computer can be a hand-held device, laptop or notebook computer, desktop computer, minicomputer, mainframe, server, cell phone, personal digital assistant, other device, or any combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A computer program product for constructing a deployment model, the computer program product comprising at least one computer-readable storage device having computer-readable program code stored therein, the computer-readable program code comprising:
    computer-usable program code for automatically discovering hardware and software resources of a data center, thus defining a current topology of the data center upon which a software application is to be deployed, wherein the automatic discovery is based upon a pre-defined search scope;
    computer-usable program code for presenting the discovered topology to a user;
    computer-usable program code for enabling the user to select at least one discovered resource for inclusion in a deployment model instance;
    computer-usable program code to generate the deployment model instance based upon the user selection; and
    computer-usable program code for creating at least one linkage between a selected discovered resource in the data center and an artifact to be created for the deployment of a corresponding software application based upon the deployment model instance.

2. The computer program product of claim 1, wherein discovering the current topology comprises discovering at least one of characteristics and dependencies of the discovered resources.

3. The computer program product of claim 2, wherein discovering dependencies of the discovered resources comprises discovering at least one of capabilities, requirements, and relationships.

4. The computer program product of claim 3, wherein discovering requirements comprises discovering at least one of dependency requirements, hosting requirements and member requirements.

5. The computer program product of claim 3, wherein discovering relationships comprises discovering at least one of dependency relationships, hosting relationships, and member relationships.

6. The computer program product of claim 1, wherein discovering the current topology comprises discovering the current topology using environment-specific handlers, and wherein the environment-specific handlers further convert the one or more discovered resources to a syntax and/or structure compatible with the deployment model.

7. The computer program product of claim 1, wherein discovering the current topology comprises discovering the current topology using customizable filters that define a scope and results of a search such that a definition of the search is not tied to a specific type of resource.

8. The computer program product of claim 1, further comprising:
    computer-usable program code for receiving a user selection of one or more discovered resources;
    wherein the one or more linkages are created based on the received user selection.

9. A method for constructing a a deployment model, the method being implemented by a computer, the method comprising:

discovering automatically, by the computer, hardware and software resources-of a data center, thus defining a current topology of the data center upon which a software application is to be deployed, wherein the automatic discovery is based upon a pre-defined search scope;

presenting the discovered topology to a user;

enabling, by the computer, the user to select at least one discovered resource for inclusion in a deployment model instance;

generating the deployment model instance based upon the user selection; and creating, by the computer, at least one linkage between a selected discovered resource in the data center and an artifact to be created for the deployment of a corresponding software application based upon the deployment model instance.

10. The method of claim 9, wherein discovering the current topology comprises discovering at least one of characteristics and dependencies of the discovered resources.

11. The method of claim 10, wherein discovering dependencies of the discovered resources comprises discovering at least one of capabilities, requirements, and relationships.

12. The method of claim 11, wherein discovering requirements comprises discovering at least one of dependency requirements, hosting requirements and member requirements.

13. The method of claim 11, wherein discovering relationships comprises discovering at least one of dependency relationships, hosting relationships, and member relationships.

14. The method of claim 9, wherein discovering the current topology comprises discovering the current topology using environment-specific handlers, and wherein the environment-specific handlers further convert the one or more discovered resources to a syntax and/or structure compatible with the deployment model.

15. The method of claim 9, wherein discovering the current topology comprises discovering the current topology using customizable filters that define a scope and results of a search such that a definition of the search is not tied to a specific type of resource.

16. The method of claim 9, further comprising:

receiving, by the computer, a user selection of one or more discovered resources;

wherein the one or more linkages are created based on the received user selection.

17. A system for constructing a deployment model, the system comprising:

a processor configured for automatically discovering hardware and software resources of a data center, thus defining a current topology of the data center upon which a software application is to be deployed, wherein the automatic discovery is based upon a pre-defined search scope;

the processor further configured to present the discovered topology to a user;

the processor further configured to enable the user to select at least one discovered resource for inclusion in a deployment model instance;

the processor further configured to generate the deployment model instance based upon the user selection; and the processor further configured for creating at least one linkage between a selected discovered resource in the data center and an artifact to be created for the deployment of a corresponding software application based upon the deployment model instance.

18. The system of claim 17, wherein discovering the current topology comprises discovering at least one of characteristics and dependencies of the discovered resources.

19. The system of claim 18, wherein discovering dependencies of the discovered resources comprises discovering at least one of capabilities, requirements, and relationships.

20. The system of claim 19, wherein discovering requirements comprises discovering at least one of dependency requirements, hosting requirements and member requirements.

21. The system of claim 19, wherein discovering relationships comprises discovering at least one of dependency relationships, hosting relationships, and member relationships.

22. The system of claim 17, wherein discovering the current topology comprises discovering the current topology using environment-specific handlers, and wherein the environment-specific handlers further convert the one or more discovered resources to a syntax and/or structure compatible with the deployment model.

23. The system of claim 17, wherein discovering the current topology comprises discovering the current topology using customizable filters that define a scope and results of a search such that a definition of the search is not tied to a specific type of resource.

24. The system of claim 17, wherein the processor is further configured for receiving a user selection of one or more discovered resources; and wherein the processor creates the one or more linkages based on the received user selection.

* * * * *